(12) United States Patent
Buchelli et al.

(10) Patent No.: US 7,531,024 B2
(45) Date of Patent: May 12, 2009

(54) PLUG-FLOW METHOD AND APPARATUS FOR OPERATING A CURVILINEAR PRESSURE VESSEL WHERE TRANSPORT PHENOMENA OCCUR

(75) Inventors: Alberto Buchelli, Houston, TX (US); William G. Todd, Victoria, TX (US); Jeffrey R. Golden, Pearland, TX (US)

(73) Assignee: Equistar Chemicals, LP, Houston, TX (US)

( * ) Notice: Subject to any disclaimer, the term of this patent is extended or adjusted under 35 U.S.C. 154(b) by 416 days.

(21) Appl. No.: 11/435,946

(22) Filed: May 17, 2006

(65) Prior Publication Data

US 2007/0266852 A1 Nov. 22, 2007

(51) Int. Cl.
*B01J 8/02* (2006.01)
(52) U.S. Cl. .......................................... 95/90; 422/220
(58) Field of Classification Search ..................... 95/90; 96/108, 139, 152; 422/171, 176, 177, 211, 422/220
See application file for complete search history.

(56) References Cited

U.S. PATENT DOCUMENTS

| | | | | |
|---|---|---|---|---|
| 2,655,273 A | * | 10/1953 | Snow | 414/301 |
| 2,980,515 A | * | 4/1961 | Horner et al. | 422/211 |
| 2,996,361 A | * | 8/1961 | Brumbaugh | 422/220 |
| 3,007,779 A | * | 11/1961 | Vlachos | 422/220 |
| 3,479,146 A | * | 11/1969 | Hochman et al. | 422/220 |
| 5,098,690 A | * | 3/1992 | Koves | 423/659 |
| 5,160,355 A | * | 11/1992 | Toppel | 96/146 |
| 5,160,513 A | * | 11/1992 | Koves | 95/90 |
| 5,779,773 A | * | 7/1998 | Cam et al. | 96/152 |
| 5,873,929 A | * | 2/1999 | Andreani et al. | 96/108 |
| 6,334,889 B1 | * | 1/2002 | Smolarek et al. | 96/149 |
| 2003/0056649 A1 | * | 3/2003 | Lee et al. | 95/90 |
| 2005/0155492 A1 | * | 7/2005 | Baksh et al. | 96/135 |

FOREIGN PATENT DOCUMENTS

| | | |
|---|---|---|
| DE | 19706541 A1 | 8/1998 |
| WO | WO 01/23080 | 4/2001 |

* cited by examiner

*Primary Examiner*—Frank M Lawrence
(74) *Attorney, Agent, or Firm*—Roderick W. MacDonald

(57) ABSTRACT

A method and apparatus for operating a pressure vessel containing a bed of particulate material comprising substantially leveling the bed and employing a plug-flow inducer in the bed.

6 Claims, 4 Drawing Sheets

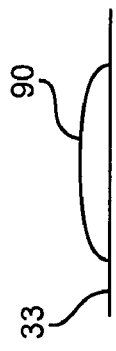
FIG. 9
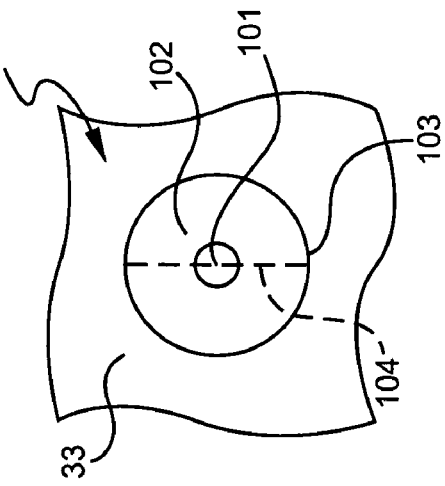
FIG. 11
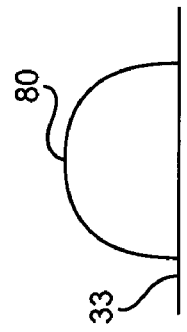
FIG. 8
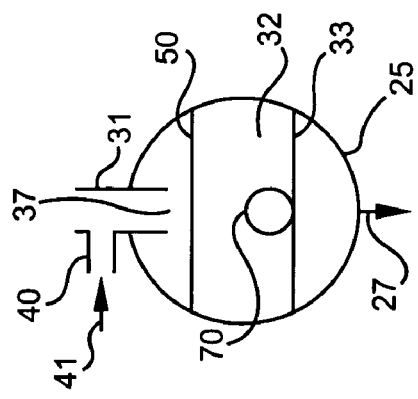
FIG. 7
FIG. 10

PLUG-FLOW METHOD AND APPARATUS FOR OPERATING A CURVILINEAR PRESSURE VESSEL WHERE TRANSPORT PHENOMENA OCCUR

BACKGROUND OF THE INVENTION

1. Field of the Invention

This invention relates to the operation of a pressure vessel and apparatus for carrying out such operation.

2. Description of the Prior Art

Although, for sake of clarity and brevity, this invention will be described in respect of the solution polymerization of ethylene, it is to be understood that this invention applies generally to curvilinear pressure vessels that operate at an elevated pressure, e.g., at least about 1,000 psig, and that contain a bed of particulate material through which a process fluid is to flow in a substantially uniform manner. For example, this invention can be applied to adsorbent beds, catalyst beds, and fixed beds such as those used in processes such as polymer formation.

Heretofore, linear high density polyethylene (HDPE) has been formed by polymerizing ethylene while dissolved in a solvent such as hexane. The resulting solvent solution also contains a polymerization catalyst such as the combination of $TiCl_4$ and $VOCl_3$. The polymerization reaction is carried out in a single liquid phase containing at least the above components using a series of stirred reactors followed by a tubular (plug flow) reactor. Downstream of the last reactor a catalyst deactivator such as acetylacetone is injected into the solution, and the resulting mixture introduced into an adsorption vessel which is a pressure vessel. In the adsorber catalyst compounds and decomposition components of the deactivator are adsorbed from the single phase solution. The polymerization reaction is carried out at an elevated temperature of from about 150 to about 280 degrees Centigrade (C.) at a pressure of from about 2,000 to about 4,000 psig. Thus, the adsorption step of this process is carried out at a very high pressure, and this requires, for sake of capital costs, an adsorber configuration that is curvilinear, typically spherical.

The adsorbent material used in this pressure vessel is typically a particulate material. These particles adsorb from the single phase liquid solution various catalyst moieties such as titanium compounds, vanadium compounds, and by-products of the decomposition of the catalyst deactivator. The adsorbent for the exemplary HDPE process above is typically activated alumina particles such as alumina spheres about 1.7 millimeters in diameter. As these particles adsorb catalyst and deactivator compounds from the single phase liquid passing through the adsorbent bed, they change in color, typically from an initially white color to varying shades of gray, to black, the darker the adsorbent particle, the greater the extent of adsorption of the aforementioned materials by that particle.

The particulate adsorbent, when initially loaded into the adsorber, is gravity poured through a nozzle opening in an upper portion of the vessel down into the interior of the vessel, and allowed to pile up therein to a predetermined level. This invariably leaves an adsorbent bed in the vessel with an uneven upper surface, typically an inverted conical surface that rises to a peak approaching, but below, the opening through which it was poured. This conical pile of particulates normally piles up at its natural angle of repose, e.g., about a 30 degree angle from the horizontal for the alumina particles used in an HDPE adsorber.

After the conical pile of adsorbant is formed in the vessel, the vessel is put into operation and the high temperature, high pressure, single phase solution aforesaid is passed into the nozzle in the vessel for contact with the adsorbent bed. This nozzle is typically an upstanding conduit whose long axis is substantially vertical. The single phase liquid solution is then passed into the nozzle at an angle that is transverse, e.g., a 90 degree angle, to the long axis of the conduit so that the solution must make a sharp turn downward in order to enter the interior of the vessel where the adsorbent bed lies.

In the exemplary HDPE process, as with many other processes, a conventional plug flow reactor is employed upstream of the adsorber to accomplish product uniformity with a uniform residence time distribution for the reactants in that reactor. By "plug flow," what is meant is substantially uniform fluid velocity distribution across a transverse cross-section of a reactor, and maintenance of that flow as that fluid passes longitudinally through the reactor from its entrance to its exit. This gives all portions of that process fluid essentially uniform residence time in the reactor. This same plug flow concept can be applied to other vessels, including, but not limited to, adsorbent vessels.

The curvilinear shape of a high pressure adsorber, the conical shape of the adsorbent bed in the adsorber, and the right angle turn the single phase solution must make after it enters the nozzle of the adsorber, all work against achieving anything like plug flow of the solution through the adsorbent bed. This causes mal-distribution of solution as it passes to and through the bed, which results in channeling of solution through localized portions of the bed. This channeling causes under-utilization of the adsorbent throughout substantial volumes of that bed, while other portions, where the channeling occurs, are forced to treat too much solution. The result of channeling can be seen in a used alumina bed height profile wherein some portions (groups) of alumina particles are black, while other groups are still white, indicating no adsorption at all.

The HDPE process must be carried out in a single phase solution. If two phases (a polymer rich phase and a solution rich phase) were allowed to form, a phenomenon known in the art as "frosting" or "two-phasing" occurs wherein solid polymer forms in the interior of the reactors and adsorbers, and deposits there. Process conditions such as temperature, pressure, and mass composition of the single phase solution stream can determine whether the stream will stay in the single phase or move toward two-phasing. If two-phasing is allowed to continue unchecked, the vessels in which it is occurring will eventually plug up with solid polyethylene thereby requiring shut down of the plant, and clean up of at least the affected vessels, a costly event in terms of lost production and clean-up costs.

Mal-distribution of single phase solution flow through an adsorber bed can cause two-phasing and polymer deposition in the bed due to an undesired change in pressure where the solution channels through the bed. This can lead to plugging of at least sections of the bed, up to, and including, the entire bed if left unchecked. This then necessitates a premature and costly shut down of the adsorber and replacement of the bed with fresh adsorbent.

Thus, it is highly desirable to operate a HDPE adsorber in a manner that more closely approaches plug flow through the particulate bed. This invention does just that by attacking both the distribution of the process fluid over the bed, and the configuration of the uneven, upper surface of the bed itself.

This premise applies as well to other bed containing pressure vessels such as catalyst containing vessels, and the like.

SUMMARY OF THE INVENTION

Pursuant to this invention, plug flow of a process fluid through a bed in a pressure vessel is more closely approached by the combination of substantially flattening the upper surface of the bed, and employing a plug-flow inducing member in the bed itself.

BRIEF DESCRIPTION OF THE DRAWINGS

FIGS. 7 through 13 show alternative embodiments of plug-flow inducers that can be employed in the practice of this invention.

DETAILED DESCRIPTION OF THE INVENTION

Figure 1:
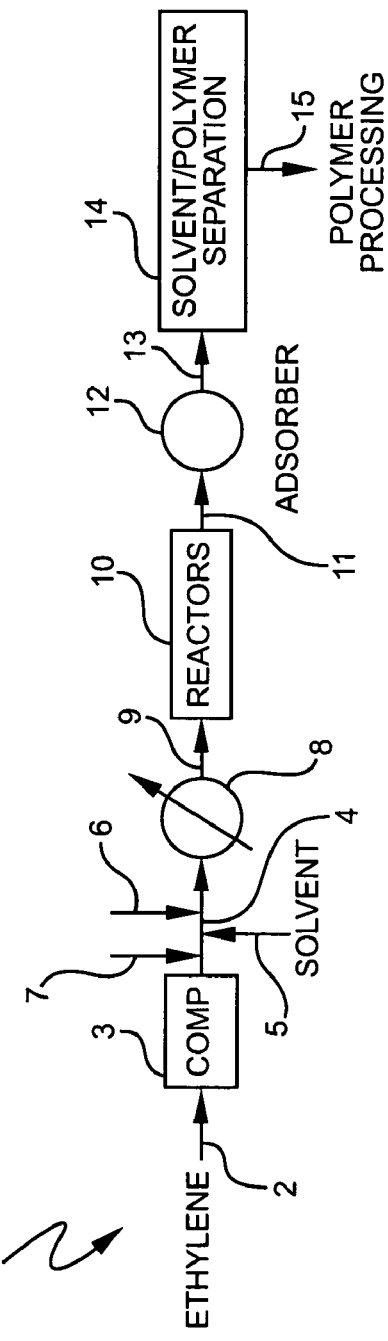
FIG. 1 shows a flow sheet for the HDPE process aforesaid.

FIG. 1 shows an ethylene polymerization process 1 wherein an ethylene monomer stream 2 is compressed at 3 and the compressed product removed into line 4. Solvent 5 and molecular hydrogen 6 are added to stream 4. One or more co-monomers 7 can also be added to this stream, if desired. Stream 4 is then heated by heat exchanger 8 to form the desired single phase solution, which is then conducted via line 9 to reactor unit 10. Unit 10 conventionally contains two continuous, stirred reactors (not shown) working in parallel and both feeding a single, continuous, stirred reactor (not shown), which, in turn, feeds a tubular reactor (not shown).

The single phase solution product containing polyethylene formed in reactor unit 10 is passed by way of line 11 to adsorber unit 12. Acetylacetone polymerization deactivator is injected (see FIG. 2) upstream of adsorber 12. The single phase solution minus the catalyst and deactivator materials adsorbed by the alumina bed of unit 12 is passed by way of line 13 to a solvent/polymer separation unit 14, from which is recovered a polymer product 15 that is then sent on for other processing such as extruding and melt cutting. In unit 14 the single phase solution is depressurized in steps to cause two-phasing so that unreacted monomer and solvent can be recovered for return to the polymerization process (not shown) up stream of reactor unit 10.

Figure 2:
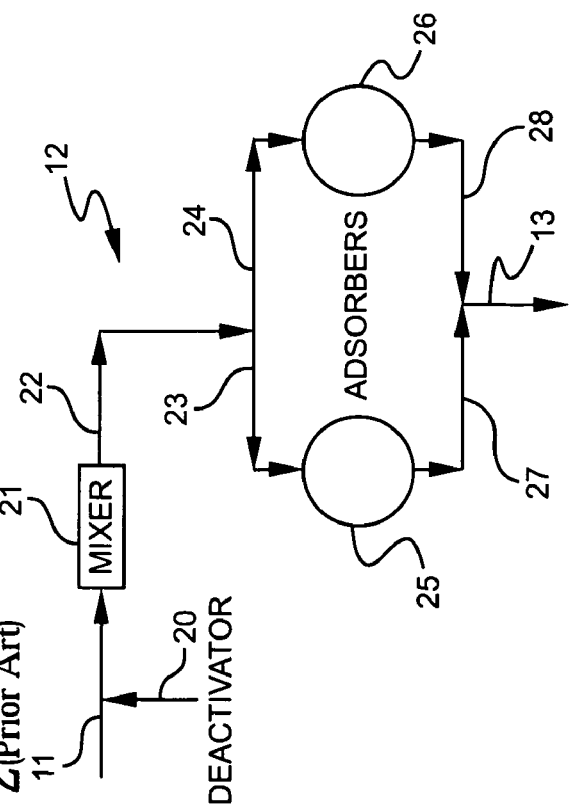
FIG. 2 shows a flow sheet for the adsorber arrangement for the HDPE process of FIG. 1.

FIG. 2 shows unit 12 to comprise two downward flow adsorbers 25 and 26 arranged for parallel operation so that one such adsorber can be in operation while the other adsorber is shut down for maintenance, replacement of its adsorbent bed, and the like. These adsorbers can be insulated or un-insulated. The single phase solution in line 11 has added thereto catalyst deactivator 20 to terminate the polymerization reaction, mixed in mixer 21, and the resulting single phase solution passed by way of line 22 into either of adsorbers 25 or 26 by way of lines 23 or 24, respectively. When passing through one of adsorbers 25 or 26, the single phase solution process fluid contacts and flows through the alumina bed (not shown) inside that adsorber for removal of catalyst and deactivator materials from the process fluid as aforesaid. The process fluid leaving the adsorbent bed is passed by way of either of lines 27 or 28 to line 13 for conduct to unit 14.

Figure 3:
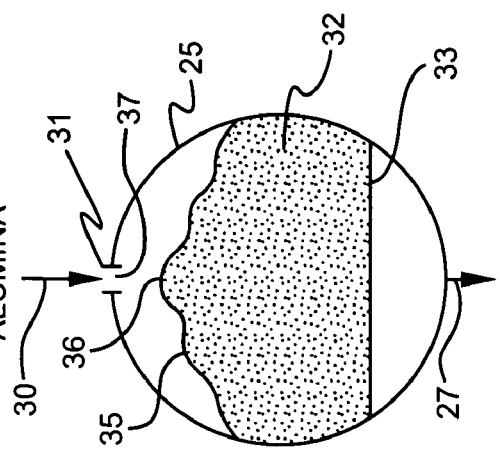
FIG. 3 shows one of the adsorbers of FIG. 2 with a particulate bed therein.

FIG. 3 shows that when, for example, adsorber 25 was initially filled with alumina adsorbent 30, the particulate adsorbent was poured (gravity flow) through upper vessel nozzle 31 onto perforate screen (support plate or floor) 33, and allowed to build upwardly from screen 33 to the mound-like configuration it naturally forms under its natural angle of repose. This configuration is a bed 32 characterized by an upper surface 35 in the configuration of an inverted conical pile. Surface 35 extends upwardly toward nozzle 31 at the natural angle of repose for the particles that make up bed 32. Peak 36 of mounded surface 35 of bed 32 approaches nozzle 31, but is below, and spaced from, the outlet opening 37 of that nozzle. Bed 32 can contain one or more adsorbant materials, mixed or in layers.

Figure 4:
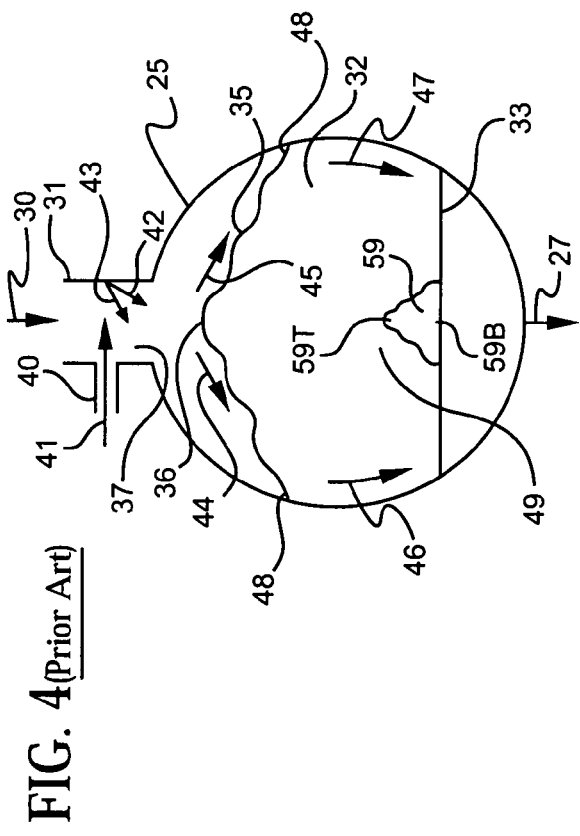
FIG. 4 shows the flow of process fluid internally of the adsorber of FIG. 3 that leads up to channeling of process fluid in the bed.

FIG. 4 shows adsorber 25 of FIG. 3 after adsorbant flow 30 is stopped, and process fluid 41 introduced into the interior of vessel 25 when that vessel is put into operation in the polymerization process of FIG. 1. FIG. 4 shows that nozzle 31 is upstanding with its long axis essentially vertical, and that it carries a transversely extending inlet conduit 40 for passing process fluid 41 into nozzle 31. Process fluid 41 thus enters nozzle 31 at an angle that is transverse (90 degrees in FIG. 4) to the long axis of nozzle 31. Thus, fluid 41 must impinge on an interior wall of nozzle 31 in order to be redirected downwardly toward nozzle opening 37 and, ultimately, to bed 32. This causes a mal-distribution of fluid 41 as shown by arrows 42 and 43, the result being that a majority of fluid 41 flows toward the outer periphery 48 of bed 32. This result is enhanced by the spherical curvature of the walls of vessel 25. Thus, fluid 41 is concentrated at outer volumes 46 and 47 of bed 32 thereby channeling (short circuiting) most of fluid 41 through these volumes, and leaving the central volume 49 either under utilized or not used at all for adsorption purposes. Channeling of fluid 41 through outer volumes 46 and 47 can cause pressure changes in those volumes sufficient to cause two-phasing of fluid 41 in those volumes. This can cause solid polymer deposition in those volumes which, in turn, can cause new channeling of fluid 41 in other, more inner volumes of bed 32 until bed 32 is essentially plugged, even in central portion 49, and requires shut down of vessel 25 and replacement of plugged bed 32.

It has been found that channeling through outer volumes 46 and 47 can leave a lower portion 59 of central volume 49 essentially untouched by process fluid 41, thereby leaving a significant portion of bed 32 unused for adsorbing purposes. This volume 59 can be of irregular shape, but is generally upstanding with a generally broader bottom end 59B than top end 59T. This causes adsorption inefficiencies, and increases the operating cost of the adsorber.

The non-uniform distribution of fluid 41 inside nozzle 31 as shown by arrows 42 and 43, compounded by the uneven (not flat) configuration of upper surface 35 of bed 32 and the round configuration of vessel 25, all work together to encourage undesired channeling 46 and 47 (and, ultimately, two-phasing) near the outer edge (periphery) 48 of bed 32. This invention combats this combination of negatives.

Figure 5:
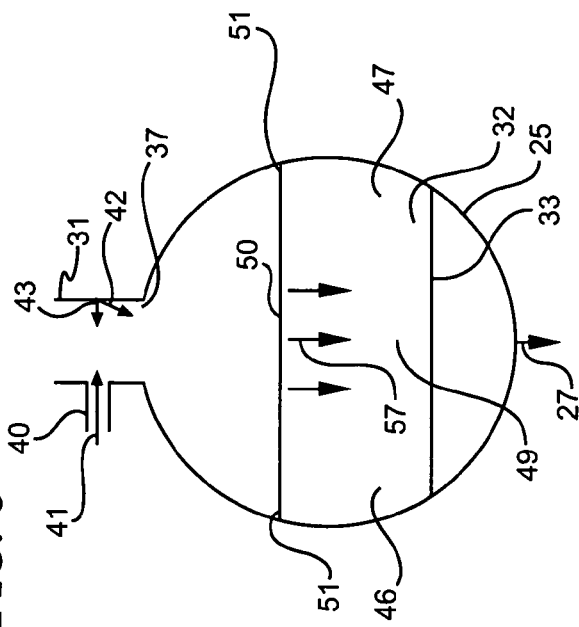
FIG. 5 shows the flow of process fluid internally of the adsorber of FIG. 4 when the uneven top surface of the bed in that absorber has been flattened pursuant to the first step of this invention.

FIG. 5 shows the arrangement of FIG. 4 after only the uneven, upper surface 35 of FIG. 4 has been substantially leveled to form a relatively even surface 50.

Leveling the upper surface of bed 32, when practiced alone, has been found to create other channeling problems in that bed. When flattened surface 50 is employed alone, it has been found that, although unused volume 59 (FIG. 4) is now used, it is used too much because, instead of channeling through outer volumes 46 and. 47 of that bed, channeling occurs in central volume 49 as shown by arrows 57. This central channeling can also cause two-phasing and solid polymer deposition, only in this case it is found initially and preferentially in central portion 49. Left unchecked, this two-phasing can eventually grow to outer volumes 46 and 47, and plug adsorber 25 from the inside out instead of the aforesaid outside in (FIG. 4).

Figure 6:
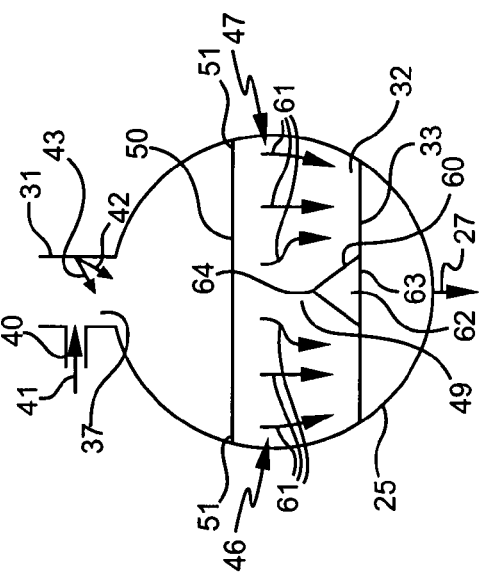
FIG. 6 shows the flow of process fluid internally of the adsorber and its bed of FIG. 4 when this invention is employed.

Nevertheless, the first step of this invention is to substantially flatten (level) the uneven upper surface 35 of bed 32 as shown by new upper bed surface 50 (FIG. 6). Surface 50 does not have to be exactly or completely flat or level in order to obtain the benefits of this invention. Surface 50 just must be substantially more level than mounded so that the configuration of the upper surface of bed 32, unlike the configuration shown in FIG. 4, does not substantially favor the flow of fluid 41 toward the newly formed periphery 51 of bed 32.

Leveling of surface 35 of FIG. 4 to approach surface 50 of FIG. 6 can be done in any manner desired. It can be done pneumatically and/or mechanically, or any other way obvious to those skilled in the art. For example an air stream can be imposed on surface 35, particularly peak 36 to force particles away from peak 36 to form new periphery 51. Alternatively, a rotating screed such as that used in finishing a newly poured concrete surface could be imposed on peak 36 to wear down the peak by moving particles outwardly there from to form new periphery 51, which periphery is higher inside vessel 25 than original periphery 48.

The second step of this invention, as shown in FIG. 6, employs a plug-flow inducer (member) 60 to redirect randomly oriented fluid 41 flows 42 and 43 when flowing inside bed 32 into more uniformly dispersed flows 61, and thereby induce a uniform residence time distribution of flow 61 through bed 32. This also results in more uniform adsorption of trace chemicals throughout the height and breadth of bed 32. Flows 61 are more evenly distributed across the entire inner volumes 46, 47, and 49 of bed 32 within periphery 51 thereby reducing the tendency of fluid 41 to collect 1) near periphery 51 due to the rounded wall configuration of adsorber 25 or 2) in central volume 49 due to the flatness of surface 50.

In the embodiment of FIG. 6 plug-flow inducer 60 is in the classical configuration of an upstanding, inverted cone having a circular base 63 that rests on or near floor 33, and a pointed top apex 64.

FIG. 7 shows one of many alternate embodiments that can be used as a plug-flow inducer within this invention. In FIG. 7, the plug-flow inducer configuration employed is a sphere 70 supported on floor 33. Sphere 70, like cone 60 and other embodiments set forth hereinbelow, can be carried on or near floor 33, and can be solid or hollow or a combination thereof in their interior, e.g., interior 62 of cone 60 (FIG. 6). The plug-flow inducers of this invention should be fabricated of a material that is chemically compatible with the process fluid with which it will come into contact. The external surface(s) of the plug-flow inducers can be essentially smooth. More than one plug-flow inducer of the same or different configuration can be employed in a single adsorber if desired so long as the substantially plug-flow results 61 of this invention are obtained to a noticeable degree. These premises apply as well to the embodiments of FIGS. 8-13 below.

FIG. 8 shows another plug-flow inducer embodiment in the form of a hemispherical member 80 supported on or near floor 33.

FIG. 9 shows another plug-flow member embodiment in the form of an oblate spheroid 90. In FIG. 9 the oblate spheroid shape takes the form of a hemi-lenticular configuration.

FIG. 10 shows a frusto-conical form 100 having a planar upper surface (top) 101, curvilinear side 102, and circular (round) base 103 having a diameter 104 (FIG. 11).

FIG. 11 shows a top view of inducer form 100.

Figure 12:
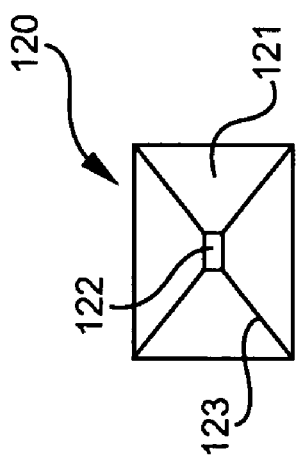

FIG. 12 shows a frusto-pyramidal form 120 as a plug-flow inducer. Form 120 has planar sides 121, planar upper surface 122, and well defined linear edges 123 between adjacent side faces 121.

Figure 13:
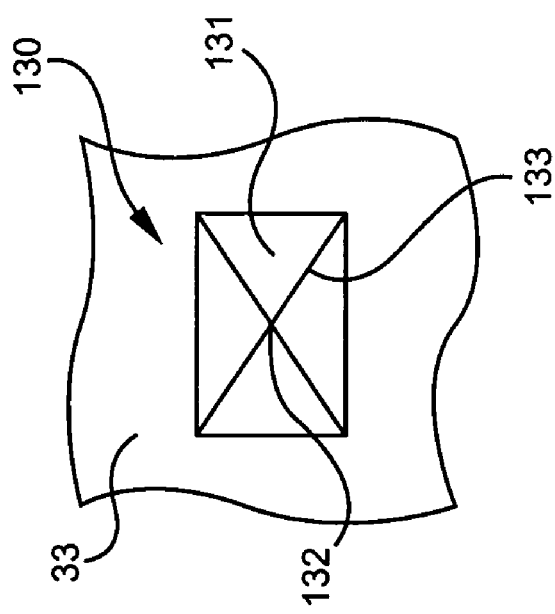

FIG. 13 shows a plug-flow inducer embodiment of the classical pyramidal form 130 having planar sides 131, pointed top 132, and well defined linear edges 133 between adjacent faces 131.

A plug flow inducing member(s) employed in this invention, whatever its form, can be of any size and volume with respect to the bed 32 that the inducer(s) is to protect so long as the essentially (primarily) plug-flow pattern 61 for process fluid 41 is achieved essentially throughout bed 32 (FIG. 6). Put another way, so long as channeling of fluid 41 throughout bed 32 (peripheral and central) is substantially reduced, if not eliminated. However, the ratio of the volume (cubic feet) of the plug-flow member(s) used in a single adsorbent bed to the volume of that bed itself absent the plug-flow member(s) can be from about 3.7/507 to about 16/507. Thus, the size of the plug-flow inducers of this invention can vary widely depending on the particularities of the specific process in which this invention is to be used. These inducers will provide plug-flow for the process fluid regardless of the void fraction of the adsorbent, or its particle size, particle size distribution, or bulk density. This invention performs well whether the process fluid is Newtonian or Non-Newtonian, or shear-thinning or shear-thickening. This invention is applicable to a wide range of process fluid viscosities; and laminar, transition, or turbulent flow regimes.

For scale-up purposes, this invention is quite adaptable to non-dimensional analysis; when the geometrical ratios of the plug-flow inducer's dimensions with regards to the height of the bed, length of the cord comprising the supporting bottom mesh, and diameter of the adsorber are kept within specific values.

For example, with the exemplary ethylene solution polymerization process aforesaid, a bed of particulate alumina spheres about 1.7 millimeters in diameter about 5.58 feet high (from support floor to level upper surface) is formed by gravity pour into the empty interior of a spherical adsorber followed by mechanical screeding to essentially level the upper surface of the bed. The adsorber vessel is about 11.25 feet in diameter. The alumina bed rests on a perforate support floor spaced about 3 feet above the bottom most point (outlet 27) of the adsorber, and the bed's upper surface, when essentially level, is about 2.6 feet below the upper most point (inlet 37) of the adsorber. The resulting bed has a mass of about 24,000 pounds (total volume without any plug-flow inducer of about 16 cubic feet), and a porosity of about 0.35.Practicing the aforesaid ethylene solution polymerization at about 280 C., about 3,000 psig, and a flow rate of single phase solution into the adsorber at about 405,405 pounds per hour; it was found that a cone shaped inducer 60, three feet in height and 52 inches in diameter at its circular base (total volume of about 551.4 cubic feet) gave optimum plug-flow 61 conditions without leaving an unused portion of the bed (volume 59, FIG. 4).

It was also found that round base diameters of 26 inches and 42 inches for 3 foot high cones improved the tendencies for plug-flow throughout the alumina bed, and, therefore, were within the scope of this invention, but such tendencies were not as pronounced as with the 52 inch base.

Computational fluid dynamics simulations on a mounded surface 35 (FIG. 3) in combination with a plug-flow inducer 60 (FIG. 6) shows that channeling would still occur in the outer portions 46 and 47 (FIG. 4), and, thus, not meet the plug-flow 61 advantage (FIG. 6) of this invention.

We claim:

1. In a method for operating a pressure vessel having a spherical configuration that contains a bed of particulate material resting on a perforate support, said bed having an uneven upper surface, wherein a fluid is introduced downwardly into said vessel through a nozzle opening, said nozzle being above said uneven upper surface, said fluid flowing into said nozzle being redirected in an angular direction toward said opening, the improvement comprising substantially flattening said upper surface of said bed before introducing said fluid into said nozzle, and employing at least one imperforate plug-flow inducer in said bed near said support that redirects the flow of said fluid around said inducer toward said perforate.

2. The method of claim 1 wherein said vessel contains an upper, middle, and lower section, said nozzle opening is disposed above and spaced from said upper surface of said bed, said fluid is allowed to flow through said bed and is recovered below said bed and in operation said vessel contains process pressures of at least about 1,000 psig.

3. The method of claim 1 wherein said fluid flow is redirected at an acute angle up to a 90 degree angle.

4. The method of claim 1 wherein said uneven surface is flattened using at least one of pneumatic and mechanical means.

5. The method of claim 1 wherein said flow inducer is one of conical, spherical, hemi-spherical, oblate spheroid, hemi-lenticular, pyramidal, and hemi-pyramidal in configuration.

6. The method of claim 1 wherein said bed is composed of more than one material arranged in alternating layers.

* * * * *